United States Patent [19]

Piatt

[11] Patent Number: 4,853,712

[45] Date of Patent: Aug. 1, 1989

[54] SHEET FEED SYSTEM FOR COMPACT PRINTER

[75] Inventor: Michael J. Piatt, Enon, Ohio

[73] Assignee: Eastman Kodak Company, Rochester, N.Y.

[21] Appl. No.: 192,570

[22] Filed: May 11, 1988

[51] Int. Cl.[4] .................... G01D 15/28; G03B 27/58; B65H 1/08; B41J 3/20

[52] U.S. Cl. .............................. 346/134; 346/76 PH; 271/131; 271/165; 355/321; 400/120; 400/185; 400/613

[58] Field of Search .......................... 346/76 PH, 134; 400/120; 271/131, 165; 355/3 SH, 14 SH

[56] References Cited

U.S. PATENT DOCUMENTS

| | | | |
|---|---|---|---|
| 4,598,301 | 7/1986 | Suzani et al. | 346/76 PH |
| 4,752,786 | 6/1988 | Inoue et al. | 346/134 R |

*Primary Examiner*—E. A. Goldberg
*Assistant Examiner*—Gerald E. Preston
*Attorney, Agent, or Firm*—John D. Husser

[57] ABSTRACT

A sheet feed and transport system for a compact printer features an idler gear which is coupled to rotate with the drive train from the platen motor to the platen and which is selectively movable into engagement with a sheet feed roller's drive gear.

5 Claims, 2 Drawing Sheets

SHEET FEED SYSTEM FOR COMPACT PRINTER

BACKGROUND OF INVENTION

1. Field of Invention

The present invention relates to compact printers having integral sheet storage and feeding capabilities and more particularly to improved systems for selectively feeding of single sheets from a supply stack into the printing zone of such printers.

2. Background Art

Compact printers have become increasingly popular as output devices for personal computers, particularly portable or "lap-top" computers. One desirable accessory feature for such printers is for storing and selectively feeding sheets of print media, to and through the printing operation. However, the addition of space and structure for storing and feeding sheets adds size to the printer and thus works away from another desirable feature, compactness.

Concurrently field U.S. application Ser. No. 07/192568, entitled "Compact Printer With Adjustable Sheet Storage Cassette", by M. Piatt, describes a new structural approach for achieving the advantages of sheet storage and mechanized sheet feed, with minimal increase to the perimeter size (or "Footprint" area) of the printer system. This approach provides a printer and sheet cassette of substantially sheet-size perimeter dimensions. The sheet cassette is rotatably coupled to the bottom of the printer so as to be indexable between a storage condition (with the perimeters of printer and cassette aligned) and an operative printing condition (wherein the stack of sheets in the cassette is operatively aligned with the print zone of the printer). With the cassette in its printing condition, a sheet feed roller can advance sheets from the cassette to the print path so that successive lines can be printed across the width of the paper in conventional page fashion.

Prior art approaches for effecting sheet feed from a supply stack to a use zone range from complex sheet feed systems for high speed copier devices to simple systems for personal printers, where emphasis is placed on compactness and part reduction rather than the speed of feeding. An example of the small printer/feeder approach is described in U.S. Pat. Nos. 4,763,138 and 4,783,669 filed Mar. 2, 1987, which features a drawer-type sheet cassette and a print platen designed to accomplish the additional function of sheet feeding. In this system the sheet supply cassette is extended from the printer housing when containing a sheet supply.

While the system described in the first mentioned U.S. application Ser. No. 07/192,568, has the advantage of allowing sheet storage, with a "footprint" area minimized to a substantially sheet-size, a different approach for achieving sheet feeder compactness is required. That is, to effect the approach of U.S. application Ser. No. 192,568, the sheet stack is shifted to the front of the printer platen for sheet feed and continuous media is fed from the rear of the print platen. Thus, the combined feeder, platen approach of U.S. Pat. Nos. 4,763,138 and 4,783,669 is not as desirable.

SUMMARY OF INVENTION

The object of the present invention is to provide simple, reliable and space-economic systems for selectively feeding sheets from the cassette of a compact printer/cassette system such as described in the concurrently filed U.S. application Ser. No. 07/192,568, cited above.

In one preferred embodiment the present invention constitutes, in a compact printer having a housing and a sheet cassette coupled to the bottom of the housing, an improved sheet feed and transport system comprising: (a) a sheet transport platen rotatable so that its periphery moves through a print zone; (b) a selectively activatable motor spaced from the transport platen; (c) a platen gear train, located along a housing side wall and coupling the platen to the motor; (d) a sheet feed roller located to feed sheets from the sheet cassette and having an integral drive gear located along the housing side wall; and (e) an idler gear which is movable to selectively feed roller drive gear to the platen gear train.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
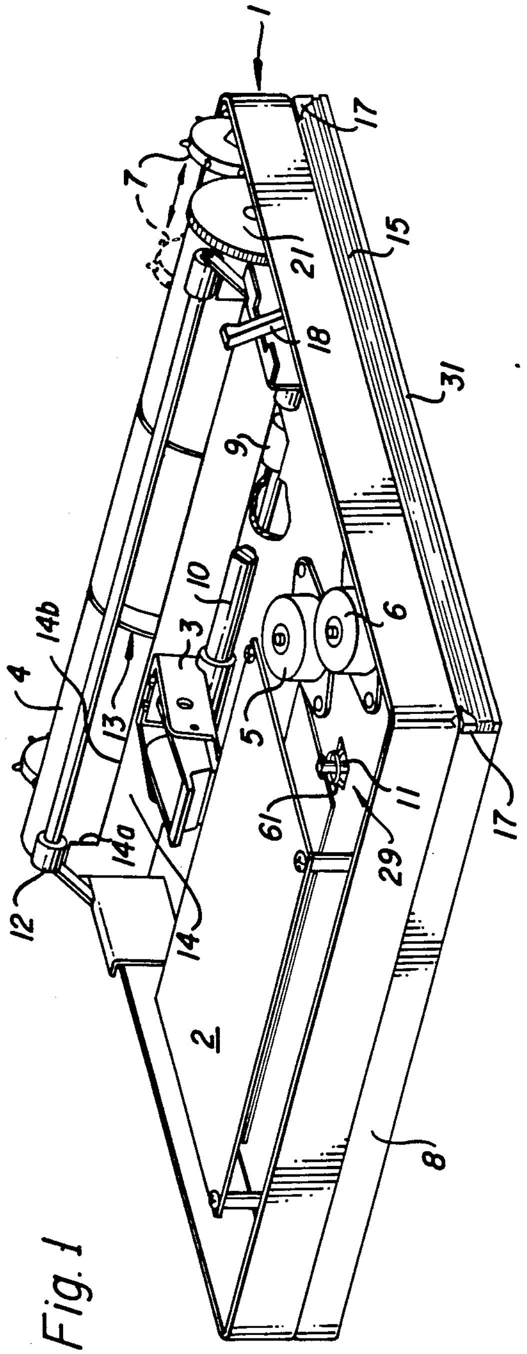
FIG. 1 is a perspective view of one printer in which the present invention can be advantageously embodied.

The printer shown in FIG. 1 has a housing designated generally 1 with top, bottom and side walls that enclose the other printer components and whose inner surfaces can provide main frame support for the assembly of the printer components. Thus, printer platen 4 is mounted for rotation to advance print media from the bottom region of the printer, up through a print zone and out an opening in the top of the printer housing (or through an open top wall lid of the housing, not shown). A print carriage 3 is mounted on guide rail 10 to traverse the print zone 13 and print lines upon media fed therepast by platen 4. Stepper motors 5 and 6 are respectively coupled via drive transmission elements to traverse the print carriage 3 and rotate platen 4, under the control of the electronics on circuit board 2, which is located in the top front of the housing enclosure. The printer can be powered by batteries located within platen 4 as described in more detail in my U.S. Pat. No. 4,759,646, filed Apr. 24, 1986. The print carriage 3 is constructed to receive, position and connect an ink jet print cartridge in the manner described in more detail in U.S. Pat. No. 4,736,213, filed Dec. 22, 1986. A sheet supply cassette 8 is shown in its carrying/storage position in FIG. 1 and will be described in more detail subsequently.

Figure 3:
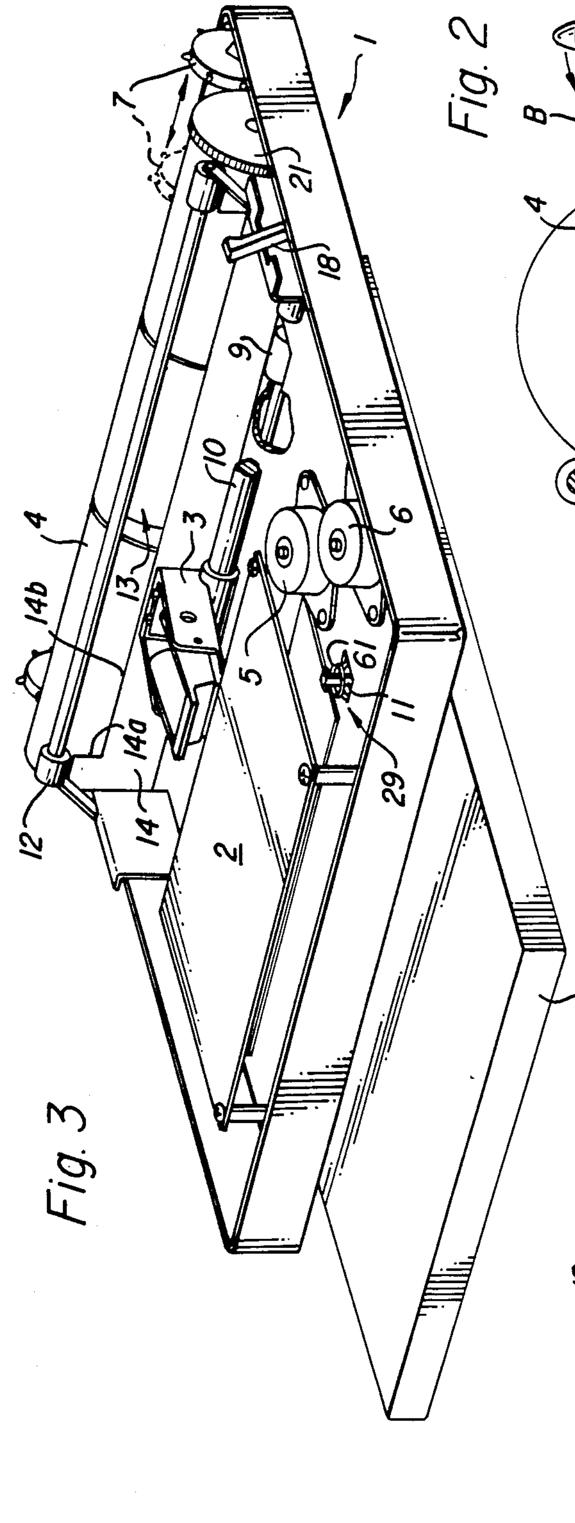
FIG. 3 is a perspective view, like FIG. 1, but with the sheet supply cassette of the printer in a printing orientation rather than its storage orientation.
Figure 2:
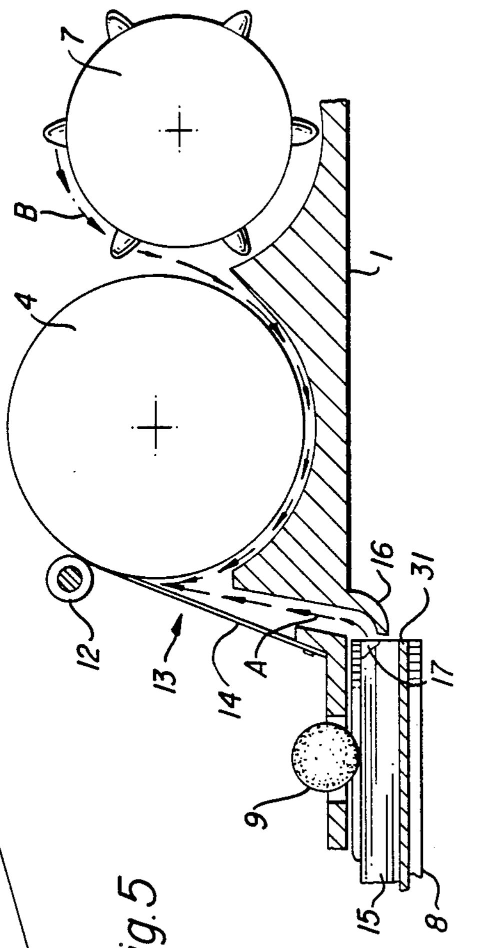
FIG. 2 is a cross-sectional schematic view illustrating the sheet media feed path of the FIG. 1 printer.

Referring now to FIG. 2, the paper feed path is shown in more detail, with the sheet supply cassette 8 rotated 90° from FIG. 1, to its sheet feed position better shown in FIG. 3. Thus, upon actuation of a sheet feed roller 9, a top sheet of paper is fed from stack 15 through buckle separators 17 on side members 90 and into the print path ingress defined by sheet guides 16, formed in the base of the printer. The lead edge of the fed sheet proceeds along the dotted arrow path A (shown in FIG. 2) between the extension of guide 16 and paper guide shim 14. As can be seen in FIGS. 1 and 2, edge portions 14*a* of guide shim 14 extend to the nips formed between platen 4 and bail rollers 12, and the central portion 14b of the shim plate is relieved to expose the print zone 13. The sheet supply container has a force plate 31 coupled to its lower wall to urge the leading portion of a contained sheet stack toward feed roller 9. FIG. 2 also shows how continuous print media can be fed over sprocket wheels 7 and beneath platen 4 from an opening in the rear wall of the printer, along the dotted arrow path B.

It can be seen, by comparing FIGS. 1 and 3, that the cassette 8 is rotatable 90° with respect to the remainder of the printer, between the storage/carrying position shown in FIG. 1 and the sheet feeding position shown in FIG. 3. In the preferred embodiment shown in those Figures, such rotatable indexing of the cassette 8 is accomplished by the spring-loaded mounting (denoted generally 29) which couples the cassette 8 to the printer housing with the cassette top wall urged toward the bottom wall of the printer.

Figure 4:
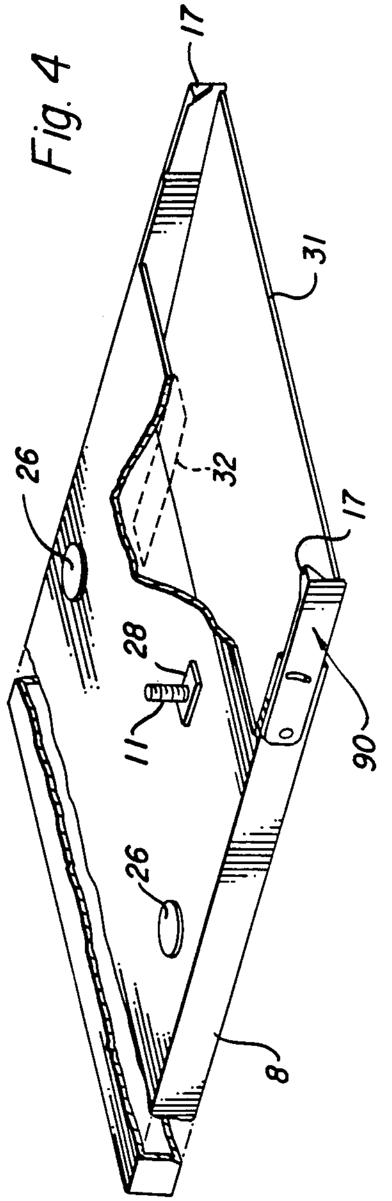
FIG. 4 is a perspective view of the sheet supply cassette of the FIG. 1 printer, as detached from the printer bottom.

The detail construction of the sheet cassette 8 and its specific construction for rotation and detenting on the bottom of the printer can be seen more clearly in FIG. 4. Thus, the cassette top wall has an attached, threaded pivot pin 11 that extends upwardly to protrude through the mounting hole in the bottom wall of the printer. Coil spring 61 is located around the portion of pin 11 that extends through the bottom hole and, during assembly, is compressed between a nut on the top of pin 11 and the bottom printer wall so as to urge the top of the container toward the bottom of the printer.

The locations for coupling cooperation between the cassette pin 11 and its receiving hole in the bottom of the printer wall are predeterminedly located to provide for a mode shift, between the FIG. 1 and FIG. 3 conditions, by a simple rotation movement of 90°. Also, the perimeters of cassette 8 and printer housing 1 are selected to be substantially the same size as the sheet media utilized in the printer (e.g., approximately $8\frac{1}{2}\times 11$ inches). In the storage position the housing and cassette perimeters are approximately coincident, one above the other (see FIG. 1) and the pin/hole rotation axis is located so that, in the 90° rotated sheet feed position (shown in FIG. 3), the cassette's longitudinal sides are centered with respect to the printer width (and thus the sheet feed path of the printer).

In order to allow easy sliding movement of the cassette during its condition-shift rotation (and to provide clearance for printer base guide 16 and the sheet feed roller which extends through a central portion of the printer bottom wall), bosses 26 are formed on the top wall of the cassette. The printer bottom wall has two indent recesses that are configured to receive two of bosses 26 in detent relation, when the cassette 8 has been rotated into the FIG. 3 sheet feed position. Also the printer bottom wall has a slot configured to receive a key portion 28*b* formed on the bottom of pivot pin 11, so that the cassette, and the exposed forward portion of its sheet stack, can move toward the printer bottom when properly indexed into the sheet feed condition. This allows the top sheet of a stack in the cassette to properly engage the feed roller 9, under upward bias of force plate 31.

Figure 5:
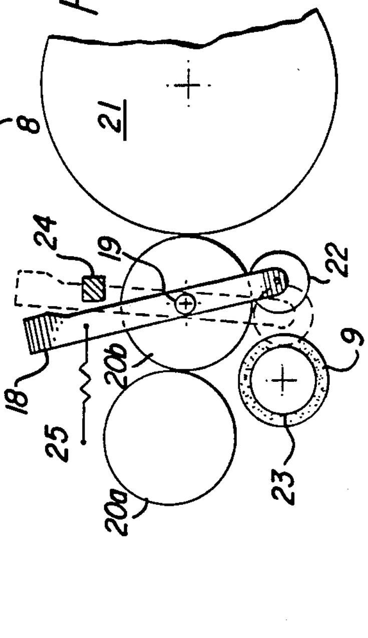
FIG. 5 is a side view of a portion of the FIG. 1 printer showing the drive transmission system in accord with the present invention.

Referring now to FIG. 5, as well as FIG. 3, it can be seen that a platen drive gear 21 is coupled to the shaft of platen 4 at the end of the platen proximate the right side wall of the printer. The drive from motor 6 is transmitted via a main gear train (which includes transmission gears 20*a* and 20*b* shown in FIG. 5) to the platen gear 21. This main gear train is mounted on a main frame assembly to extend along the right side wall of the printer from motor 6 to platen gear 21.

In accord with the present invention the drive from motor 6 to platen gear 21 is also selectively engageable to effect the sheet feed from cassette 8 by feed roller 9. Thus, a user actuable lever 18 is mounted at a central portion to pivot on shaft 19 of transmission gear 20*b*. Spring 25 urges the top end of lever 18 in a counterclockwise direction, as shown in FIG. 5. The bottom end of lever 18 is constructed to rotatably mount idler gear 22, which has a peripheral size and gear configuration to mate with, and be driven by, the peripheral surface of transmission gear 20*b*. A feed roller drive gear 23 is coupled to the end of feed roller 9 and has a gear configuration adapted to mate with, and be driven by, idler gear 22, when lever 18 is rotated clockwise to the dotted line position shown in FIG. 5.

To initiate a sheet feed sequence the operator pushes the top of lever 18 forwardly in the printer (toward platen 4). This movement causes the idler gear 22 to rotate around the periphery of transmission gear 20*b* and into engagement with feed roller gear 23. At the forawrd end of its actuation movement, lever 18 engages switch 24, which signals to the printer's microprocessor that a sheet feed sequence should commence. Under the microprocessor control, motor 6 is energized and drive is transmitted to the platen 4 (via the platen drive transmission train including gears 20*a*, 20*b*) and to gear 23 of feed roller 9. Rotation of the feed roller causes the top sheet of the stack in cassette 8 to be fed along the dotted line path shown in FIG. 2.

The gear ratios of the system just described are selected, in view of the platen and feed roller diameters, so that the tangential speeds of the feed roller and platen are substantially equal. This assures a smooth passage of the lead sheet end between the guide shim 14 and the platen. The feed sequence is programmed to continue motor drive until a predetermined length of sheet is advanced, preferably just sufficient to place the lead sheet end in the nip formed by bail roller 12 and platen 4.

After completion of the sheet feed sequence, the operator releases lever 18 and it moves counterclockwise, under the force of spring 25, to the solid line position shown in FIG. 5. Thereafter, the motor 6 is periodically actuated by the printer control to advance successive lines of the sheet through the print zone; however, gear 22 is not then in engagement with gear 23 so that it merely idles with the rotation of platen transmission gear 20*b*.

The invention has been described in detail with particular reference to preferred embodiments thereof, but it will be understood that variations and modifications can be effected within the spirit and scope of the invention. For example, idler gear 22 can be engaged by actuation of a solenoid, upon a feed signal from the operator control panel, or the host computer.

I claim:

1. In a compact printer having a housing, means forming a sheet supply cassette proximate the bottom of said housing and means for printing lines on sheet media at a printer print zone, an improved sheet-feed and transport system comprising:

(a) a media transport platen rotatably mounted in said housing so that its periphery moves through said print zone;

(b) selectively activatable motor means mounted in said housing at a location spaced from said platen;

(c) a platen gear train, located along a side wall of said housing, for drivingly coupling said platen to said motor means;

(d) a sheet feed roller rotatably mounted in said housing at a location for feeding sheets from said cassette toward said platen and having an integral drive gear located along said housing side wall; and (e) idler gear means rotatably mounted in said housing and selectively movable to and from a position drivingly coupling said feed roller drive gear to said platen gear train; said idler gear means comprising:

(i) a lever having a central pivot axis located on the rotational axis of a transmission gear in said main gear train, a handle portion extending toward the top of said printer and a gear support end extending below said main gear train; and (ii) an idler gear rotatably mounted on said lever support end and having a drive periphery in engagement with said transmission gear;

said lever being pivotable on said central axis so that said idler gear shifts around the periphery of said transmission gear into and out of engagement with said feed roller drive gear.

2. The invention defined in claim 1 further including circuit means for operating said motor means and switch means, located in the path of said lever, for activating said motor circuit in response to said lever moving said idler gear toward engagement with feed roller drive gear.

3. The invention defined in claim 2 wherein said circuit means includes control means for operating said motor to feed a top sheet, from said cassette, a predetermined distance onto said platen in response to an activation of said switch means.

4. The invention defined in claim 3 further including spring means for urging said lever toward its non-engaged condition.

5. In a compact printer of the kind having a housing, means defining a sheet media print path to and through a print zone, and means for printing on media at said print zone, a sheet media supply system comprising:

(a) a sheet cassette coupled to the bottom of said housing and rotatable on an axis generally normal to the bottom of said printer housing between: (i) a storage carrying position wherein cassette edges are generally flush with the side walls of said printer and (ii) a sheet feeding position wherein the length dimension of a supported sheet media stack is operatively aligned with said print path; and (b) means for feeding sheets from an aligned stack into said print path including:

(i) a media transport platen rotatably mounted in said housing so that its periphery moves through said print zone;

(ii) selectively activatable motor means mounted in said housing at a location spaced from said platen;

(iii) a platen gear train, located along a side wall of said housing, for drivingly coupling said platen to said motor means;

(iv) a sheet feed roller rotatably mounted in said housing at a location for feeding sheets from said casssette toward said platen and having an integral drive gear located along said housing side wall; and (v) idler gear means rotatably mounted in said housing and selectively movable to and from a position drivingly coupling said feed roller drive gear to said platen gear train.

* * * * *